United States Patent
Sawada et al.

(10) Patent No.: US 9,231,494 B2
(45) Date of Patent: Jan. 5, 2016

(54) POWER SUPPLY DEVICE WITH A RESONANT BRIDGE CIRCUIT CONTROL UNIT

(71) Applicants: CENTRAL JAPAN RAILWAY COMPANY, Aichi (JP); FUJI ELECTRIC CO., LTD., Kawasaki-shi (JP)

(72) Inventors: Tadashi Sawada, Saitama (JP); Toshiaki Murai, Tokyo (JP); Yoshiyasu Hagiwara, Kanagawa (JP); Masayuki Tobikawa, Kanagawa (JP); Ayako Saga, Tokyo (JP); Tomotaka Nishijima, Hyogo (JP); Toshiya Kaneko, Hyogo (JP)

(73) Assignees: CENTRAL JAPAN RAILWAY COMPANY, Nagoya-Shi (JP); FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/322,188

(22) Filed: Jul. 2, 2014

(65) Prior Publication Data

US 2015/0023079 A1 Jan. 22, 2015

(30) Foreign Application Priority Data

Jul. 18, 2013 (JP) ................................. 2013-149630

(51) Int. Cl.
*H02M 7/5388* (2007.01)
*H02M 7/219* (2006.01)
(Continued)

(52) U.S. Cl.
CPC ............... *H02M 7/219* (2013.01); *H02J 5/005* (2013.01); *H02M 1/42* (2013.01); *H02M 1/4258* (2013.01); *H02M 7/5388* (2013.01)

(58) Field of Classification Search
CPC ............. H02M 2001/0003; H02M 2001/0009; H02M 2001/0048; H02M 2001/0054; H02M 2001/0058; H02M 7/219; H02M 7/5388; H02M 1/4233; H02M 1/4241; H02M 1/4258; Y02B 70/1491; Y02B 70/1441; H02J 5/005

USPC ....................... 363/21.02, 21.03, 17, 125, 127; 323/271, 207
See application file for complete search history.

(56) References Cited

U.S. PATENT DOCUMENTS

2006/0267523 A1* 11/2006 Seelig ..................... H02J 5/005
                                                           318/16
2012/0127765 A1*  5/2012 Maruyama .............. H02J 5/005
                                                          363/126

(Continued)

FOREIGN PATENT DOCUMENTS

JP          2002-354711 A     12/2002
JP          2012-125138 A      6/2012

(Continued)

OTHER PUBLICATIONS

U.S. Appl. No. 14/200,790.

(Continued)

*Primary Examiner* — Adolf Berhane
*Assistant Examiner* — Jye-June Lee
(74) *Attorney, Agent, or Firm* — Rabin & Berdo, P.C.

(57) ABSTRACT

In a power supply device, the bridge circuit including a plurality of switching arms which is an inverse-parallel circuit of a semiconductor switch and a diode. The power supply device includes a control unit. The control unit switches the semiconductor switch such that a voltage v between AC terminals becomes a positive-negative voltage whose peak value is the voltage $V_o$ between the DC terminals only during prescribed time periods before and after a point that has deviated from each zero crossing point ZCP of a current i by a prescribed compensation period $\phi$ and such that the voltage v between the AC terminals becomes a zero voltage during the other time periods, and sets the compensation period $\phi$ such that a time period during which the voltage v between the AC terminals becomes a zero voltage is the shortest.

3 Claims, 16 Drawing Sheets

100 : HIGH-FREQUENCY POWER SOURCE
110 : PRIMARY SIDE POWER SUPPLY LINE
120 : POWER RECEIVING COIL
320 : POWER RECEIVING CIRCUIT
$Q_u$, $Q_x$, $Q_v$, $Q_y$ : SEMICONDUCTOR SWITCHES
$D_u$, $D_x$, $D_v$, $D_y$ : DIODES
$C_0$ : SMOOTHING CAPACITOR
$C_r$ : RESONANCE CAPACITOR
CT : CURRENT DETECTING UNIT
R : LOAD

(51) Int. Cl.
*H02J 5/00* (2006.01)
*H02M 1/42* (2007.01)

(56) References Cited

U.S. PATENT DOCUMENTS

2014/0292092 A1* 10/2014 Ichinose .............. H02M 7/219
    307/104
2014/0372780 A1   12/2014 Murai et al.

FOREIGN PATENT DOCUMENTS

JP   2014-195387 A   10/2014
JP   2014-241698 A   12/2014

OTHER PUBLICATIONS

U.S. Appl. No. 14/300,822.

* cited by examiner

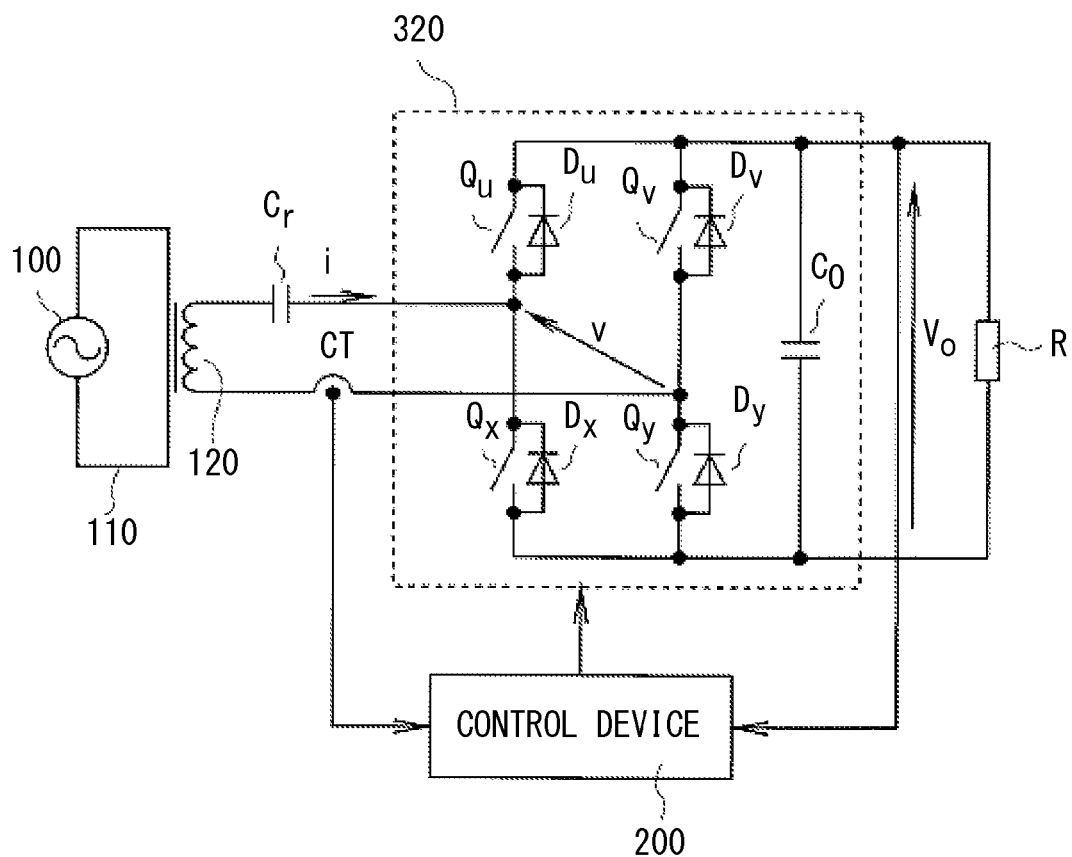
100 : HIGH-FREQUENCY POWER SOURCE
110 : PRIMARY SIDE POWER SUPPLY LINE
120 : POWER RECEIVING COIL
320 : POWER RECEIVING CIRCUIT
$Q_u$, $Q_x$, $Q_v$, $Q_y$ : SEMICONDUCTOR SWITCHES
$D_u$, $D_x$, $D_v$, $D_y$ : DIODES
$C_0$ : SMOOTHING CAPACITOR
$C_r$ : RESONANCE CAPACITOR
CT : CURRENT DETECTIMG UNIT
R : LOAD
F I G. 1

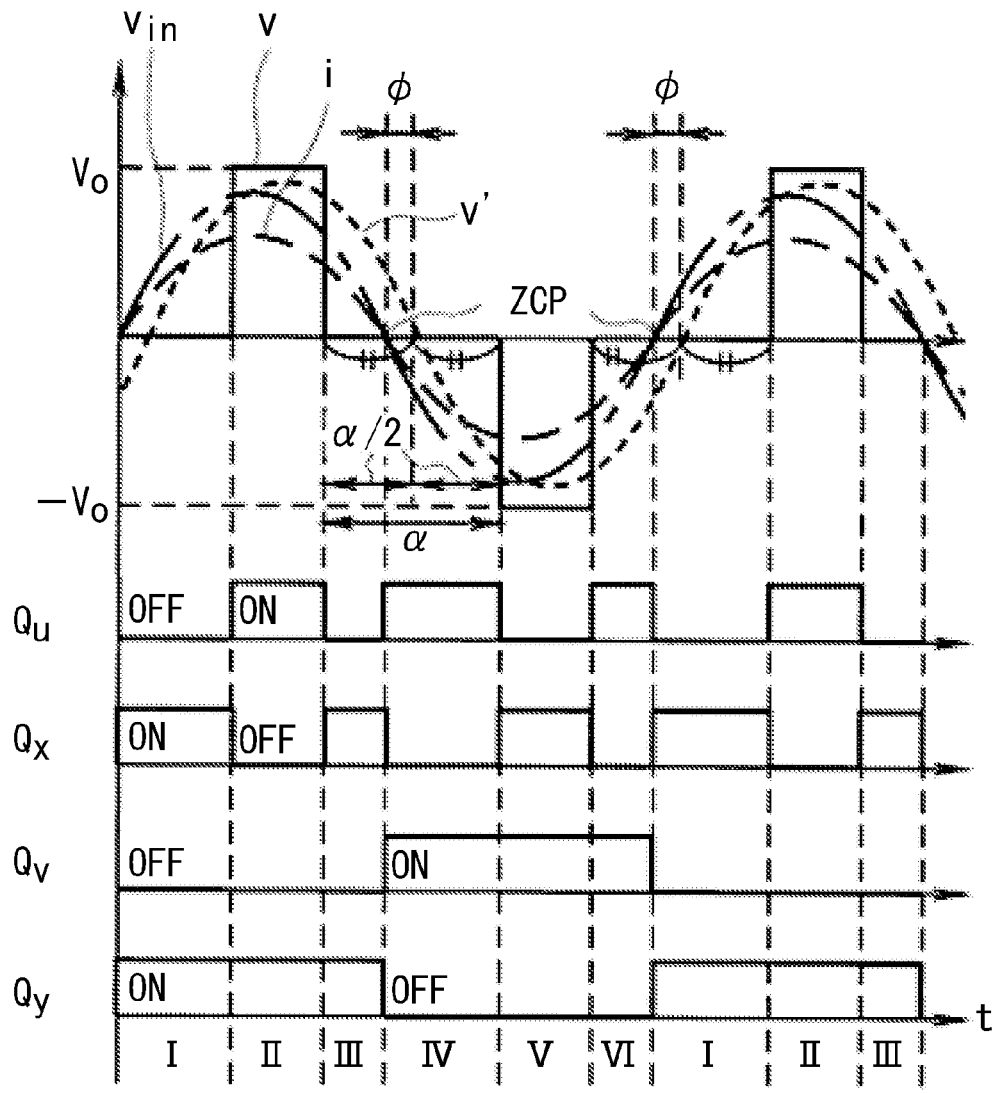
F I G. 4

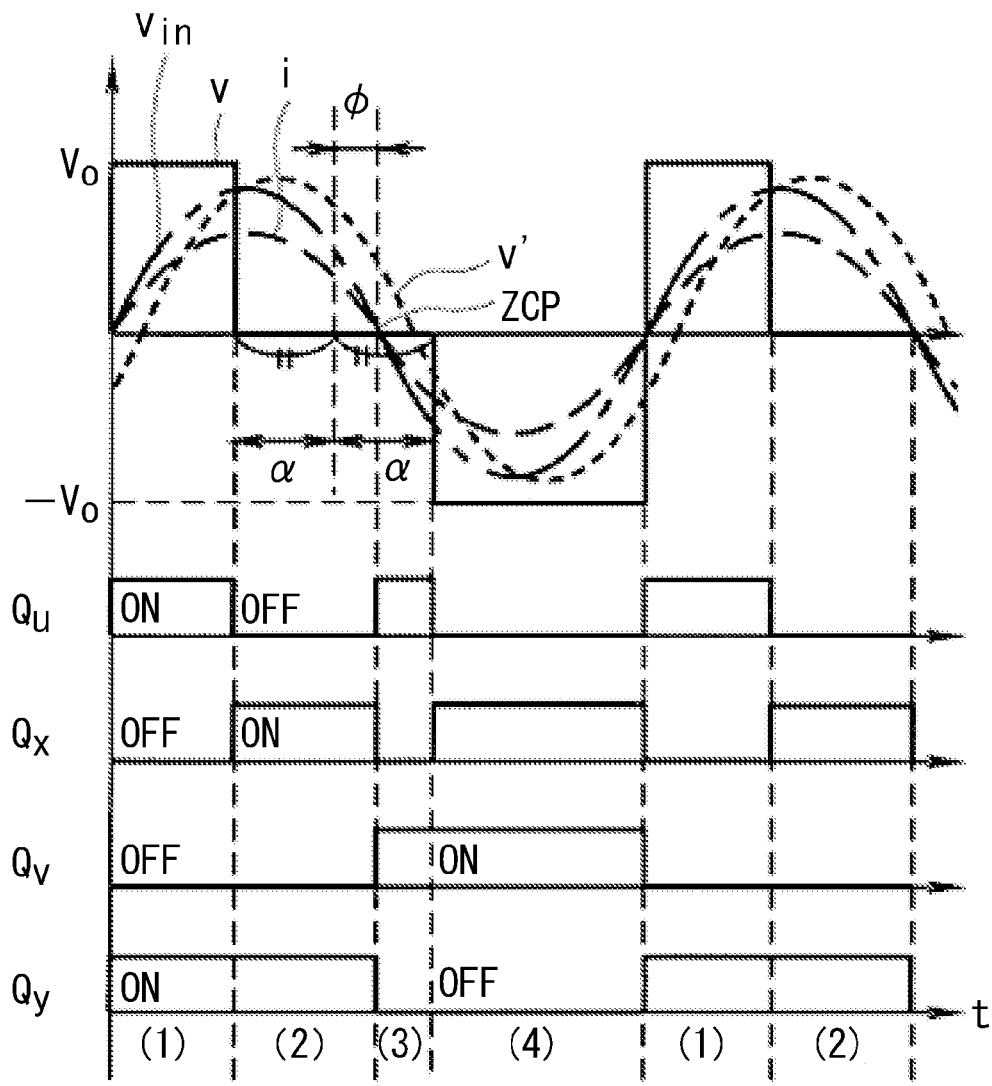
F I G. 5

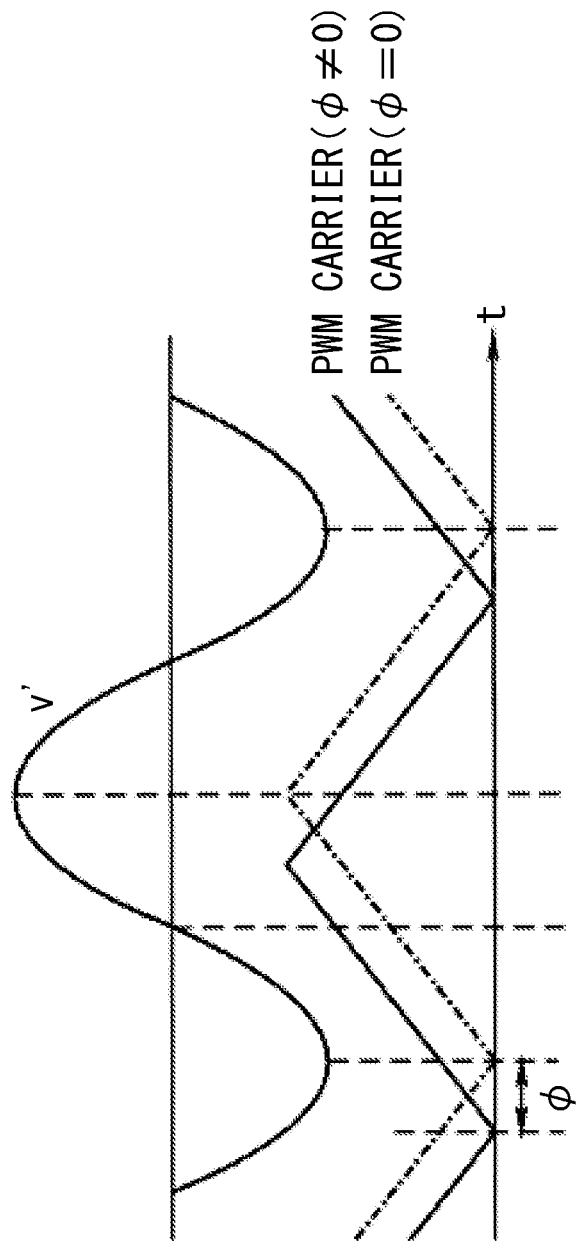
F I G. 7

F I G. 1 5    PRIOR ART

POWER SUPPLY DEVICE WITH A RESONANT BRIDGE CIRCUIT CONTROL UNIT

CROSS REFERENCE TO RELATED APPLICATIONS

This application is based upon and claims the benefit of priority from prior Japanese Patent Application No. 2013-149630, filed Jul. 18, 2013, the entire contents of which are incorporated herein by this reference.

BACKGROUND OF THE INVENTION

1. Field of the Invention

The present invention relates to a power supply device that supplies power to a load by utilizing a magnetic coupling between coils.

2. Description of the Related Art

Methods to supply power to a load utilizing a magnetic coupling mutually between coils by electromagnetic induction include, for example, non-contact power supply. The principle thereof is forming a so-called transformer by magnetically coupling a plurality of coils through a space, and utilizing the electromagnetic induction between the coils, thereby exchanging power.

For example, the method includes arranging a primary side coil that corresponds to a power supply source as a power supply line in a rail shape, integrating a secondary side coil with a power receiving circuit to form a mobile object, and at the same time, making the primary side coil and the secondary side coil be opposed to each other. With this, it is possible to conduct a non-contact power supply to a mobile object that moves along the power supply line.

Here, FIG. 8 illustrates a non-contact power supply device described in Japanese Laid-open Patent Publication No. 2002-354711. In FIG. 8, to both ends of a high-frequency power source 100, a primary side power supply line 110 is connected as a coil. To the primary side power supply line 110, a power receiving coil 120 is coupled magnetically, and the primary side power supply line 110 and the power receiving coil 120 form a sort of a transformer.

Both ends of the power receiving coil 120 are connected to a pair of AC (alternating-current) terminals of a full-wave rectifier circuit 10 through a resonance capacitor $C_r$. The power receiving coil 120 and the resonance capacitor $C_r$ form a serial resonance circuit.

The full-wave rectifier circuit 10 is formed by bridge-connecting diodes $D_u$, $D_v$, $D_x$, and $D_y$. To a pair of DC (direct-current) terminals of the full-wave rectifier circuit 10, a constant voltage control circuit 20 is connected that controls a DC output voltage of the full-wave rectifier circuit 10 to be a reference voltage value. The constant voltage control circuit 20 is formed of a step-up chopper circuit that is formed, for example, of a reactor $L_1$, a diode $D_1$, a smoothing capacitor $C_0$, and a semiconductor switch $SW_1$. Further, to both ends of the smoothing capacitor $C_0$, a load R is connected.

In FIG. 8, a control device that switches a semiconductor switch $SW_1$ is omitted.

In the conventional technology disclosed in FIG. 8, a high-frequency current is applied to the primary side power supply line 110 by the high frequency power source 100 and the high-frequency power supplied through the power receiving coil 120 is input into the full-wave rectifier circuit 10 to convert it into DC power.

Generally, in this type of a non-contact power supply device, due to a change in a gap length between the primary side power supply line 110 and the power receiving coil 120, or a position gap of both, a voltage induced in the power receiving coil 120 changes. As a result of this, the DC output voltage of the full-wave rectifier circuit 10 changes. Further, characteristics of the load R also cause the DC output voltage of the full-wave rectifier circuit 10 to change. Accordingly, in FIG. 8, the DC output voltage of the full-wave rectifier circuit 10 is controlled to have a constant value by the constant voltage control circuit 20.

In the non-contact power supply device, the higher the frequency of the current supplied through a coil, the smaller an excitation inductance needed for transmitting a power, and a size of a coil or a core arranged at a periphery of the coil may be made to be small. However, in a power converter which forms a high frequency power source device or a power receiving circuit, the higher the frequency of the current flowing through the circuit, the larger an increase in a switching loss of a semiconductor switch, and a power supply efficiency lowers. Accordingly, it is common to set the frequency of the power supplied in a non-contact state to several [kHz] to several tens of [kHz].

In the non-contact power supply device illustrated in FIG. 8, in particular, a power receiving circuit in a subsequent stage of the resonance capacitor $C_r$ has the following problems.

(1) Since the power receiving circuit is configured by the full-wave rectifier circuit 10 and the constant voltage control circuit 20, a size of an entire circuit becomes large and it causes an increase in installation space or cost.

(2) Since losses occur not only in the diodes $D_u$, $D_v$, $D_x$, and $D_y$ of the full-wave rectifier circuit 10 but also in the reactor $L_1$, the semiconductor switch $SW_1$, and the diode $D_1$ of the constant voltage control circuit 20, these losses cause a reduction in a power supply efficiency.

As a conventional technology that solves the problems above, inventors have proposed a non-contact power supply device and a method for controlling the same as described in Japanese Laid-open Patent Publication No. 2012-125138.

FIG. 9 illustrates a non-contact power supply device described in Japanese Laid-open Patent Publication No. 2012-125138. In FIG. 9, 310 is a power receiving circuit. The power receiving circuit 310 includes semiconductor switches $Q_u$, $Q_x$, $Q_v$, and $Q_y$, diodes $D_u$, $D_x$, $D_v$, and $D_y$, and a smoothing capacitor $C_0$. The semiconductor switches $Q_u$, $Q_x$, $Q_v$, and $Q_y$ are bridge-connected. The diodes $D_u$, $D_x$, $D_v$, and $D_y$ are connected in inverse-parallel to the switches $Q_u$, $Q_x$, $Q_v$, and $Q_y$, respectively. The capacitors $C_x$ and $C_y$ are respectively connected in parallel to the switches $Q_x$ and $Q_y$ of a lower arm. The smoothing capacitor $C_0$ is connected between DC terminals of a bridge circuit being formed of these elements. A series circuit of a resonance capacitor $C_r$ and a power receiving coil 120 is connected between AC terminals of the bridge circuit, and a load R is connected to both ends of the smoothing capacitor $C_0$.

200 is a control device that generates a driving signal for switching the semiconductor switches $Q_u$, $Q_x$, $Q_v$, and $Q_y$. The control device 200 generates the above mentioned driving signal on the basis of a current i of the power receiving coil 120 detected by a current detection unit CT and a voltage $V_o$ between DC terminals (DC output voltage) of the power receiving circuit 310.

In the non-contact power supply device, by controlling the semiconductor switches $Q_u$, $Q_x$, $Q_v$, and $Q_y$, a voltage v between the AC terminals of the bridge circuit is controlled to be a positive-negative voltage whose peak value is the voltage $V_o$ between the DC terminals. A power supplied from a primary side power supply line 110 to the power receiving circuit 310 is a product of the current i of the power receiving coil 120 and the voltage v between the AC terminals. The control device 200 adjusts a phase of driving signals of the semiconductor switches $Q_u$, $Q_x$, $Q_v$, and $Q_y$ on the basis of the voltage $V_o$ between the DC terminals such that a control of the supplied power, that is, a constant control of the voltage $V_o$ between the DC terminals, becomes available. Further, by configuring the power receiving circuit 310 using the bridge circuit which is formed of the switches $Q_u$, $Q_x$, $Q_v$, and $Q_y$ and the diodes $D_u$, $D_x$, $D_v$, and $D_y$, an operation of keeping the power constant is available even when the load R is a regenerative load.

According to this non-contact power supply device, the voltage $V_o$ between the DC terminals may be controlled in a constant state by a phase control of the driving signals of the semiconductor switches $Q_u$, $Q_x$, $Q_v$, and $Q_y$ without using a constant voltage control circuit, as illustrated in FIG. 8. In addition, the power receiving circuit 310 may be configured only of the bridge circuit and the smoothing capacitor $C_0$. Therefore, a circuit configuration may be simplified, the size and the cost thereof may be reduced, and further, losses may be reduced by reducing the number of component parts, and consequently, a highly efficient and stable non-contact power supply may become available. In addition, by a charging/discharging action of the capacitors $C_x$ and $C_y$, a so-called soft-switching is performed so as to reduce switching losses and further improve an efficiency.

However, in the conventional technology described in Japanese Laid-open Patent Publication No. 2012-125138, the current i of the power receiving coil 120 becomes a leading phase to a fundamental wave component of the voltage v between the AC terminals. Therefore, there is a problem that the input power factor of the power receiving circuit 310 reduces, and the problem invites an increase in a loss throughout the entire device and causes obstructions in further downsizing of the entire device.

In view of the foregoing, the applicant has proposed a non-contact power supply device in which an input power factor of a power receiving circuit has been improved (hereinafter referred to as a "first prior application invention") as described in Japanese Laid-open Patent Publication No. 2013-071432.

FIG. 10 is a circuit diagram of the first prior application invention. In FIG. 10, a power receiving circuit 320 includes semiconductor switches $Q_u$, $Q_x$, $Q_v$, and $Q_y$, diodes $D_u$, $D_x$, $D_v$, and $D_y$, and a smoothing capacitor $C_0$. The semiconductor switches $Q_u$, $Q_x$, $Q_v$, and $Q_y$ are bridge-connected. The diodes $D_u$, $D_x$, $D_v$, and $D_y$ are respectively connected in inverse-parallel to the switches $Q_u$, $Q_x$, $Q_v$, and $Q_y$. The smoothing capacitor $C_0$ is connected between a pair of DC terminals of a bridge circuit being formed of these elements. A series circuit of a resonance capacitor $C_r$ and a power receiving coil 120 is connected between a pair of AC terminals of the bridge circuit, and a load R is connected to both ends of the smoothing capacitor $C_0$. Here, 100 is a high frequency power source, and 110 is a primary side power supply line.

On the other hand, a control device 200 generates driving signals of the switches $Q_u$, $Q_x$, $Q_v$, and $Q_y$ on the basis of a voltage $V_o$ between the DC terminals and a current i of the power receiving coil 120 detected by a current detection unit CT and outputs the driving signals. Although it is not illustrated, the voltage $V_o$ between the DC terminals is detected by a well-known voltage detection unit such as a DC voltage detector.

Described next is an operation when power is supplied from the power receiving coil 120 to the load R in FIG. 10.

FIG. 11 illustrates a current i that flows through the power receiving coil 120, a voltage v between the AC terminals of the bridge circuit, a fundamental wave component v' of the voltage v, and driving signals of the switches $Q_u$, $Q_x$, $Q_v$, and $Q_y$. The switches $Q_u$, $Q_x$, $Q_v$, and $Q_y$ perform a switching operation with a constant frequency synchronized with the current i. In FIG. 11, a ZCP' represents a zero crossing point of the current i. Described below is an operation in each time period (1) to (4) of FIG. 11.

(1) Time period (1) (switches $Q_u$ and $Q_y$ are turned on): The current i flows with a route of a receiving coil 120→a resonance capacitor $C_r$→a diode $D_u$→a smoothing capacitor $C_0$→a diode $D_y$→the power receiving coil 120. The voltage v between the AC terminals becomes a positive voltage whose peak value is a voltage $V_o$ between DC terminals. During this time period, a smoothing capacitor $C_0$ is charged by the current i.

(2) Time period (2) (switches $Q_x$ and $Q_y$ are turned on): The current i flows with a route of a receiving coil 120→a resonance capacitor $C_r$→a switch $Q_x$→a diode $D_y$→the power receiving coil 120. The voltage v between the AC terminals becomes a zero voltage.

(3) Time period (3) (switches $Q_u$ and $Q_v$ are turned on): The current i flows with a route of a resonance capacitor $C_r$→a power receiving coil 120→a diode $D_v$→a switch $Q_u$→the resonance capacitor $C_r$. The voltage v between the AC terminals becomes a zero voltage.

(4) Time period (4) (switches $Q_x$ and $Q_v$ are turned on): The current i flows with a route of a resonance capacitor $C_r$→a power receiving coil 120→a diode $D_v$→a smoothing capacitor $C_0$→a diode $D_x$→the resonance capacitor $C_r$. The voltage v between the AC terminals becomes a negative voltage whose peak value is the voltage $V_o$ between the DC terminals. During this time period, the smoothing capacitor $C_0$ is charged by the current i.

Hereafter, operations are transitioned to a switching mode of the time period (1), and similar operations are repeated.

As is clear from FIG. 11, the control device 200 performs a switching control of the semiconductor switches $Q_u$, $Q_x$, $Q_v$, and $Q_y$. Consequently, the voltage v between the AC terminals is controlled such that the voltage v becomes a zero voltage only during time periods α before and after one of two zero crossing points ZCP' of the current i that flows through the power receiving coil 120 and such that the voltage v becomes a positive-negative voltage whose peak value is the voltage $V_o$ between the DC terminals during the other time periods. A power supplied from the primary side power supply line 110 to the power receiving circuit 320 is a product of the current i and the voltage v. Accordingly, the control device 200 adjusts the driving signals of the switches $Q_u$, $Q_x$, $Q_v$, and $Q_y$ on the basis of a detected value of the voltage $V_o$ between the DC terminals such that a control of the supplied power, that is, a constant control of the voltage $V_o$ between the DC terminals, becomes available.

When this happens, as illustrated in FIG. 11, since a phase difference between the current i and the fundamental wave component v' of the voltage v between the AC terminals becomes 0°, an input power factor of the power receiving circuit 320 may be set to 1.

Here, in the first prior application invention, when resonance frequency of the power receiving coil 120 and the resonance capacitor $C_r$ completely coincides with a power source frequency, the input power factor of the power receiving circuit 320 becomes 1, but when the resonance frequency deviates from the power source frequency, the input power factor of the power receiving circuit 320 is decreased. The reason for that is described below.

FIG. 12 illustrates an input side equivalent circuit of the power receiving circuit 320 in a case in which the resonance frequency of the power receiving coil 120 and the resonance capacitor $C_r$ deviates from the power source frequency. In FIG. 12, a voltage $v_{in}$ induced in the power receiving coil 120 is represented as an AC power source, and the reference numeral 400 denotes an impedance that corresponds to the power receiving circuit 320 and the load R. Generally, the other impedance to the load R can be ignored, and therefore the reference numeral 400 may be regarded as a pure resistance that corresponds to the load R.

Further, FIG. 13 illustrates operating waveforms of a current i that flows through the power receiving coil 120, an induced voltage $v_{in}$ of the power receiving coil 120, a voltage v between AC terminals of the bridge circuit, a fundamental wave component v' of the voltage v, and driving signals of the switches $Q_u$, $Q_x$, $Q_v$, and $Q_y$.

As illustrated in FIG. 12, inductance of the power receiving coil 120 is assumed to be L[H], and capacitance of the resonance capacitor $C_r$ is assumed to be $C_r$[F] similarly to a reference numeral of the component. Further, when the power source frequency is assumed to be $f_s$[Hz], combined inductance $L_s$[H] of the inductance L and the resonance conductor $C_r$ is defined by the expression φ.

$$2\pi f_s L_s = 2\pi f_s L - \frac{1}{2\pi f_s C_r} \tag{1}$$

On the other hand, a resonance frequency of a resonance circuit being formed of the power receiving coil 120 and the resonance capacitor $C_r$ is represented by the expression (2).

$$f_c = \frac{1}{2\pi\sqrt{LC_r}} \tag{2}$$

Accordingly, when $f_c = f_s$, $L_s = 0$ is established, and when $f_c \neq f_s$, $L_s \neq 0$ is established.

In addition, according to the control method illustrated in FIG. 11, a phase of v' coincides with that of i. Therefore, when the current i of the power receiving coil 120 is represented as I sin ωt, v' is represented as V' sin ωt.

On the other hand, $v_{in}$ is represented by the sum of the fundamental wave component v' of v and $v_L$ by the circuit illustrated in FIG. 12 so as to be represented by the expression (3).

$$\begin{aligned}
V_{in}(\omega t) &= v'(\omega t) + v_L(\omega t) \\
&= V'\sin(\omega t) + j(2\pi f_s)L_s I \sin(\omega t) \\
&= V'\sin(\omega t) + 2\pi f_s L_s I \cos(\omega t) \\
&= V_a \sin(\omega t + \theta)
\end{aligned} \tag{3}$$

$$\left( V_a = \sqrt{V'^2 + (2\pi f_s L_s I)^2}, \; \theta = \arcsin(2\pi f_s L_s I / V_a) \right)$$

When $L_s = 0$, $v_{in} = V'$ sin ωt is established, and a phase difference θ between $v_{in}$ and i(=I sin ωt) becomes zero, and an input power factor of the power receiving circuit 320 becomes 1. However, when $L_s \neq 0$, $v_{in}$ and i has a phase difference θ as illustrated in FIG. 13, and the input power factor is decreased.

In view of the foregoing, the applicant has proposed a non-contact power supply device described in Japanese Patent Application No. 2013-123810 (hereinafter referred to as a "second prior application invention"). The second prior application invention aims at improving an input power factor of a power receiving circuit even when $L_s \neq 0$, namely, when a resonance frequency of a resonance circuit being formed of a power receiving coil and a resonance capacitor does not coincide with a power source frequency.

A configuration of a circuit in the second prior application invention is similar to that of the circuit illustrated in FIG. 10, and described below is a power factor improvement operation according to the second prior application invention.

FIG. 14 illustrates operating waveforms of a current i that flows through the power receiving coil 120 in FIG. 10, an induced voltage $v_{in}$ of the power receiving coil 120, a voltage v between AC terminals of the bridge circuit, and a fundamental wave component v' of the voltage v between the AC terminals of the bridge circuit, and driving signals of the switches $Q_u$, $Q_x$, $Q_v$, and $Q_y$.

In addition, FIG. 15 illustrates an input side equivalent circuit of a power receiving circuit 320 in this case, and the reference numeral 400 denotes an impedance that corresponds to the power receiving circuit 320 and a load R. Generally, the other impedance can be ignored for the load R, and therefore the reference numeral 400 can be regarded as a pure resistance that corresponds to the load R. The reference numeral 401 denotes a capacitive reactance component of v'.

In the second prior application invention, the control device 200 provides driving signals to the switches $Q_u$, $Q_x$, $Q_v$, and $Q_y$ such that a middle point of a time period during which a peak value of v is 0 deviates from one zero crossing point ZCP in one cycle of the current i by a compensation period (angle) β. As a result, the input power factor of the power receiving circuit 320 is improved. According to these driving signals, the voltage v between the AC terminals has a waveform that is asymmetric with respect to the zero crossing point ZCP of i in which the voltage v is a zero voltage during time periods before and after the middle point (respectively referred to as "α") and the voltage v is a positive-negative voltage whose peak value is a voltage $V_0$ between DC terminals during the other periods. Accordingly, a phase of v' deviates from a phase of i. Here, when a time period β is given such that a voltage drop caused by the capacitive reactance component 401 of v' illustrated in FIG. 15 compensates for a voltage drop $v_L$ in $L_s$, the impedance of the circuit apparently becomes a pure resistance. Accordingly, as the phase of i coincides with a phase of $v_{in}$, the input power factor of the power receiving circuit 320 is set to 1.

Described next is a method for obtaining the time period β for setting the input power factor to 1. First, v' is expanded by fourier series, and is represented by the expression (4).

$$v'(\omega t) = a_1 \cos(\omega t) + b_1 \sin(\omega t) \tag{4}$$

From FIG. 14, $a_1$ and $b_1$ in the expression (4) are obtained by the expressions (5) and (6), respectively.

$$\begin{aligned}
a_1 &= \frac{1}{\pi} \int_0^{2\pi} v(\omega t)\cos(\omega t)\,d\omega t \\
&= \frac{1}{\pi} \int_0^{\pi-(\alpha-\beta)} V\cos(\omega t)\,d\omega t + \frac{1}{\pi}\int_{\pi+(\alpha+\beta)}^{2\pi} (-V)\cos(\omega t)\,d\omega t \\
&= \frac{V}{\pi}\{\sin(\alpha-\beta) - \sin(\alpha+\beta)\} \\
&= -\frac{2V}{\pi}\cos\alpha\sin\beta
\end{aligned} \tag{5}$$

-continued $$b_1 = \frac{1}{\pi}\int_0^{2\pi} V(\omega t)\sin(\omega t)d\omega t \qquad (6)$$

$$= \frac{1}{\pi}\int_0^{\pi-(\alpha-\beta)} V\cos(\omega t)d\omega t + \frac{1}{\pi}\int_{\pi+(\alpha+\beta)}^{2\pi} (-V)\cos(\omega t)d\omega t$$

$$= \frac{V}{\pi}\{2 + \cos(\alpha-\beta) + \cos(\alpha+\beta)\}$$

$$= \frac{2V}{\pi}(1 + \cos\alpha\cos\beta)$$

On the other hand, from FIG. 15, v' may be represented by the expression (7).

$$v'(\omega t) = v_{in}(\omega t) - v_L(\omega t) \qquad (7)$$

When the input power factor is set to 1, the phase of i coincides with the phase of $v_{in}$, and therefore when $i_{in}(\omega t)=I_{in}\sin(\omega t)$ is assumed, $v_{in}(\omega t)=V_{in}\sin(\omega t)$ is established. Accordingly, the expression (7) may be represented by the expression (8).

$$v'(\omega t) = V_{in}\sin(\omega t) - j\omega L_s I\sin(\omega t) \qquad (8)$$

$$= -\omega L_s I\cos(\omega t) + V_{in}\sin(\omega t)$$

When putting $V_L=\omega L_s I$, the expressions (9) and (10) are established by the expressions (4)-(6) and (8).

$$a_1 = -\frac{2V}{\pi}\cos\alpha\sin\beta = -V_L \qquad (9)$$

$$b_1 = \frac{2V}{\pi}(1 + \cos\alpha\cos\beta) = V_{in} \qquad (10)$$

Accordingly, β and α at the time of setting the input power factor to 1 are obtained by the expressions (11) and (12), respectively.

$$\beta = \tan^{-1}\left(-\frac{V_L}{\frac{2V}{\pi} - V_{in}}\right) \qquad (11)$$

$$\alpha = \cos^{-1}\left(\frac{\pi V_L}{2V\sin\beta}\right) \qquad (12)$$

Namely, even when the power source frequency does not coincide with the resonance frequency and $L_s \neq 0$, the control device 200 provides driving signals that have been calculated by using a and R obtained by the expressions (11) and (12) so as to drive the switches $Q_u$, $Q_x$, $Q_v$, and $Q_y$. As a result of driving the switches $Q_u$, $Q_x$, $Q_v$, and $Q_y$ by these driving signals, the input power factor of the power receiving circuit 320 is controlled to be 1.

When other impedances have a great influence, for example due to a high wiring inductance, and the reference numeral 400 in FIG. 15 cannot be regarded as a pure resistance, a time period β is provided such that a reactance component included in the reference numeral 400 is also compensated for. As a result, the input power factor is set to 1.

In addition, when a waveform of v is the same as that in FIG. 14, the driving signals of the switches $Q_u$, $Q_x$, $Q_v$, and $Q_y$ may be, for example, signals as illustrated in FIG. 16. Also in this case, by driving the switches $Q_u$, $Q_x$, $Q_v$, and $Q_y$ by applying α and β obtained by the expressions (11) and (12), the input power factor of the power receiving circuit 320 can be set to 1.

However, the second prior application invention has the following problem.

Namely, in the second prior application invention, an induced voltage $v_{in}$ cannot be detected during the switching of the switches $Q_u$, $Q_x$, $Q_v$, and $Q_y$, and it is also difficult to calculate the induced voltage $v_{in}$. Therefore, it is difficult to obtain a compensation period β for setting the input power factor to 1 from the theoretical expressions described above during the operation of a power supply device.

SUMMARY OF THE INVENTION

In view of the foregoing, the problem to be solved by the present invention is to provide a power supply device that improves an input power factor of a power receiving circuit even during the operation of the power supply device when a resonance frequency of a resonance circuit being formed of a power receiving coil and a resonance capacitor does not coincide with a power source frequency, inhibits a loss throughout the entire device and realizes a reduced size and cost of the entire device.

In order to solve the problem above, a power supply device according to claim 1 of the present invention includes:
  a power receiving coil configured to exchange power by an external magnetic coupling;
  a bridge circuit in which one end of the power receiving coil is connected to one AC terminal through a resonance capacitor forming a resonance circuit with the power receiving coil and another end of the power receiving coil is connected to another AC terminal;
  a smoothing capacitor configured to be connected between DC terminals of the bridge circuit and to be connected to both ends of a load;
  a current detection unit configured to detect an input current that flows through the power receiving coil;
  a voltage detection unit configured to detect a voltage between the DC terminals of the bridge circuit; and
  a control unit configured to switch semiconductor switches in the bridge circuit,
and the bridge circuit includes a plurality of switching arms which is an inverse-parallel circuit of the semiconductor switches and diodes. In the power supply device according to claim 1 of the present invention,
  the control unit switches the semiconductor switches such that a voltage between the AC terminals of the bridge circuit becomes a positive-negative voltage whose peak value is the voltage between the DC terminals only during prescribed equal time periods before and after a point that has deviated from each zero crossing point in one cycle of the input current by a prescribed compensation period and such that the voltage between the AC terminals becomes a zero voltage during the other periods, and sets the compensation period such that a time period during which the voltage between the AC terminals becomes a zero voltage is the shortest.

In a power supply device according to claim 2 of the present invention, the control unit switches the semiconductor switches such that the voltage between the AC terminals of the bridge circuit becomes a zero voltage only during prescribed equal time periods before and after a point that has deviated from each zero crossing point in one cycle of the input current by a prescribed compensation period and such that the voltage between the AC terminals becomes a positive-negative voltage whose peak value is the voltage between the DC terminals during the other periods, and sets the compensation period such that a time period during which the voltage between the AC terminals becomes a zero voltage is the shortest.

In a power supply device according to claim 3 of the present invention, the control unit switches the semiconductor switches such that the voltage between the AC terminals of the bridge circuit becomes a zero voltage only during prescribed equal time periods before and after a point that has deviated from one of two zero crossing points in one cycle of the input current by a prescribed compensation period and such that the voltage between the AC terminals becomes a positive-negative voltage whose peak value is the voltage between the DC terminals during the other periods, and sets the compensation period such that a time period during which the voltage between the AC terminals becomes a zero voltage is the shortest.

BRIEF DESCRIPTION OF THE DRAWINGS

The present invention will be more apparent from the following detailed description when the accompanying drawings are referenced.

FIG. 1 is a circuit diagram presenting an example of a power supply device according to the present invention.

FIG. 4 illustrates an operation of a second embodiment in the power supply device illustrated in FIG. 1.

FIG. 5 illustrates an operation of a third embodiment in the power supply device illustrated in FIG. 1.

FIG. 7 illustrates an operation of FIG. 6.

DESCRIPTION OF THE EMBODIMENTS

Described below are embodiments of the present invention with reference to the drawings.

FIG. 1 is a circuit diagram presenting an example of a power supply device of the present invention to which inventions according to claims 1-3 are applied. Although the present invention is applicable to both a non-contact power supply device and a contact power supply device, in each of the following embodiments, a case is described in which the present invention is applied to the non-contact power supply device.

Figure 10:
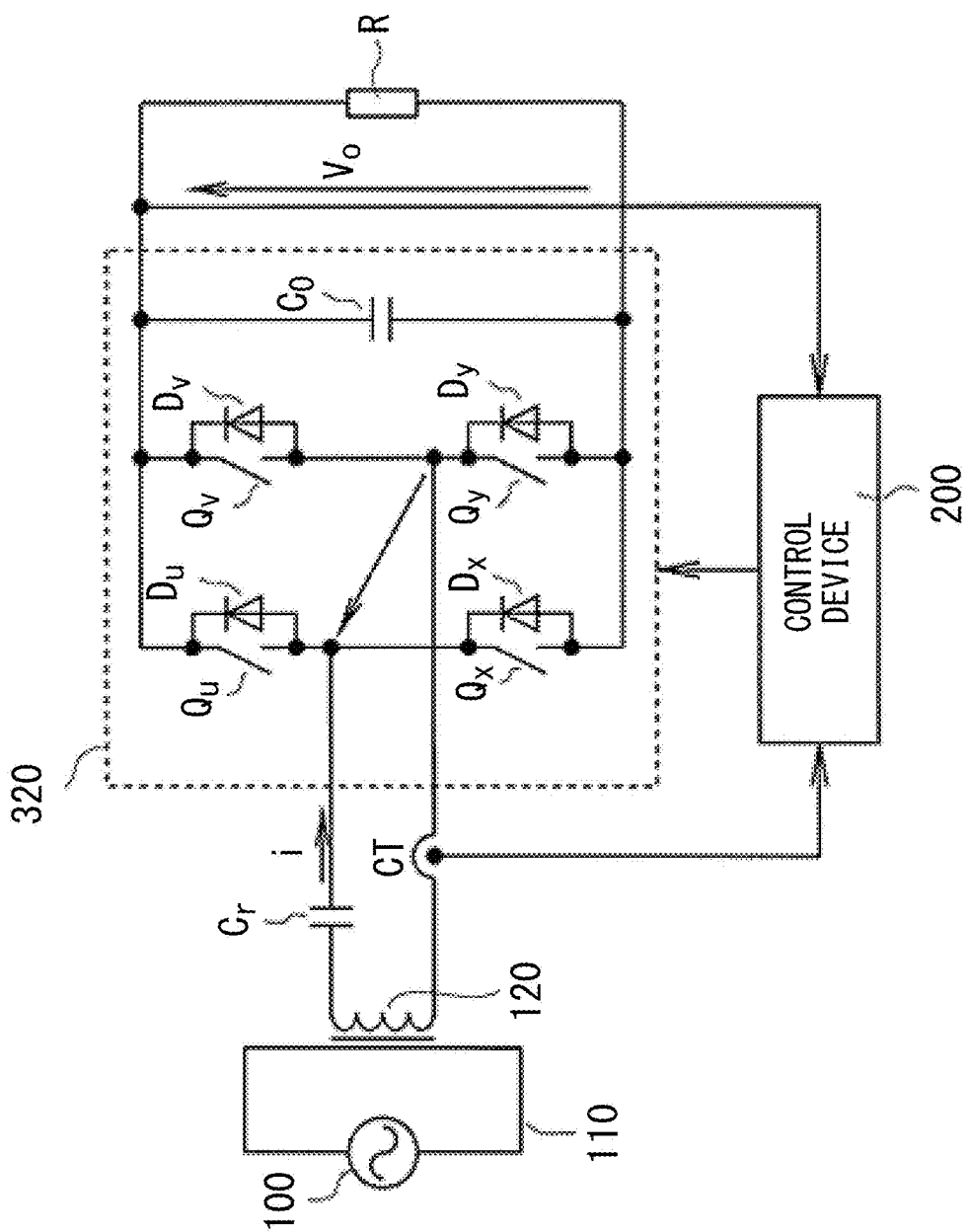
FIG. 10 is a circuit diagram of a first prior application invention.
Figure 11:
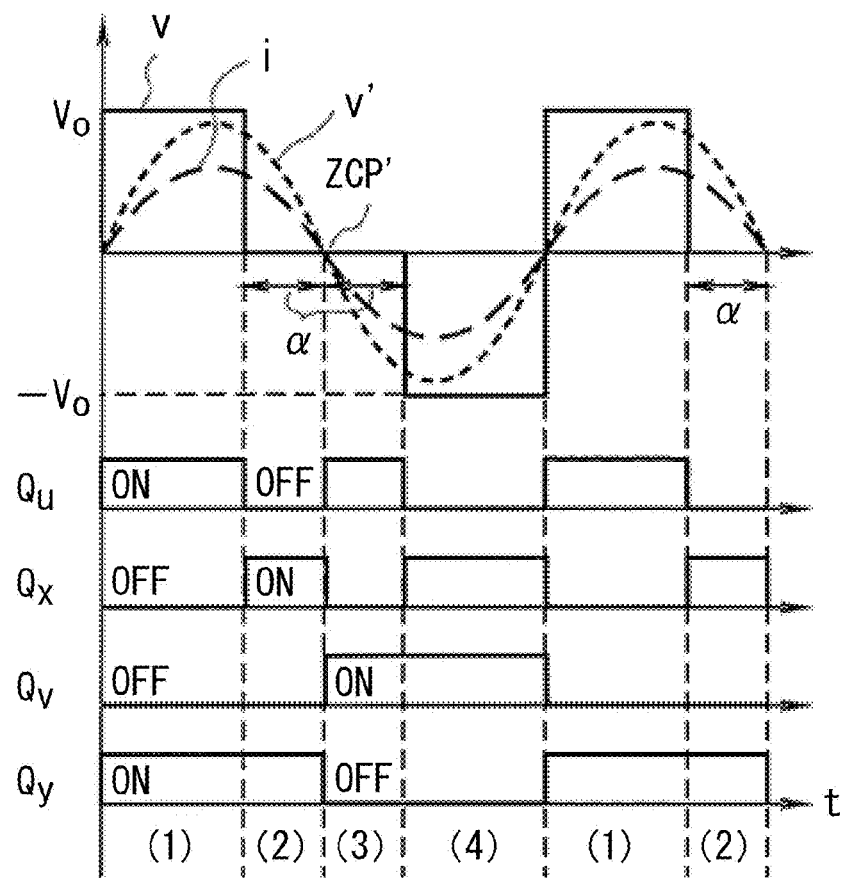
FIG. 11 illustrates an operation of the first prior application invention.
Figure 12:
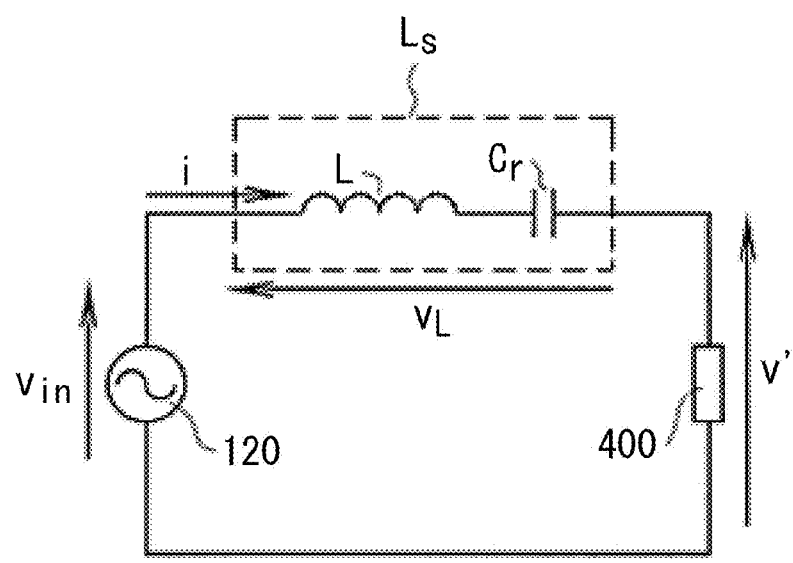
FIG. 12 illustrates an input side equivalent circuit of a power receiving circuit illustrated in FIG. 10.
Figure 13:
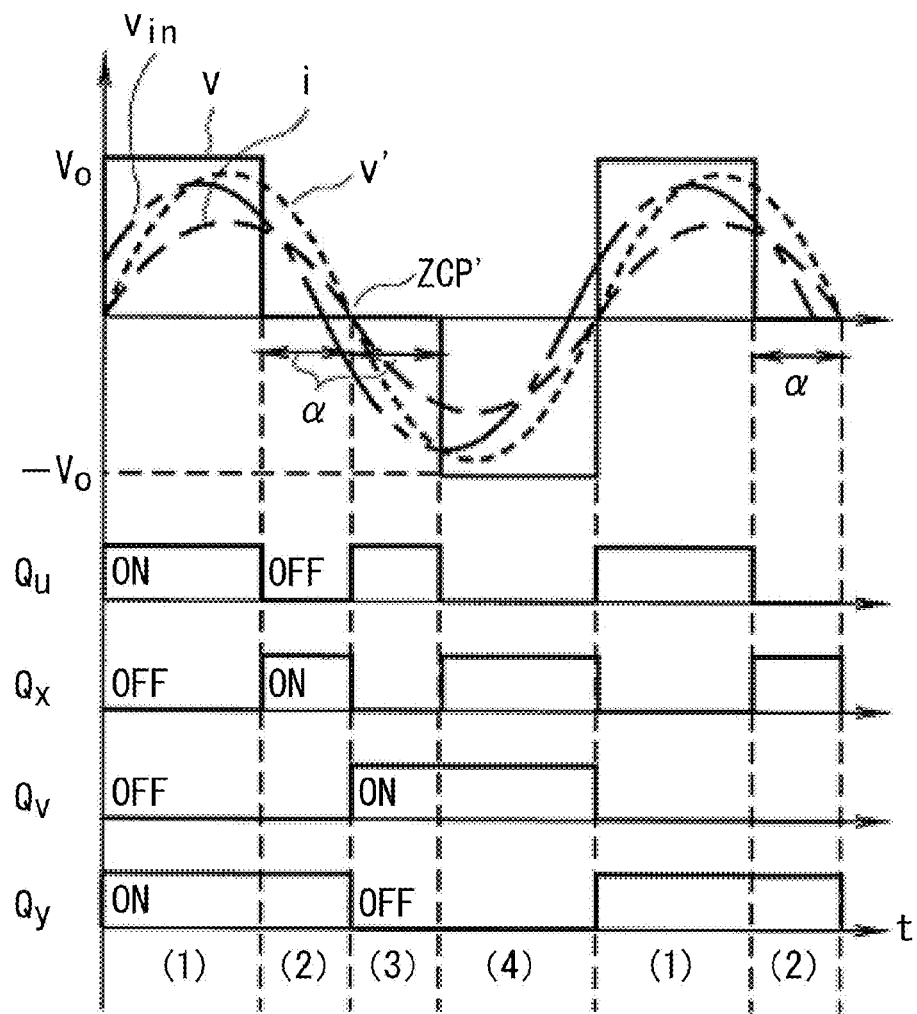
FIG. 13 illustrates an operation of the first prior application invention.
Figure 14:
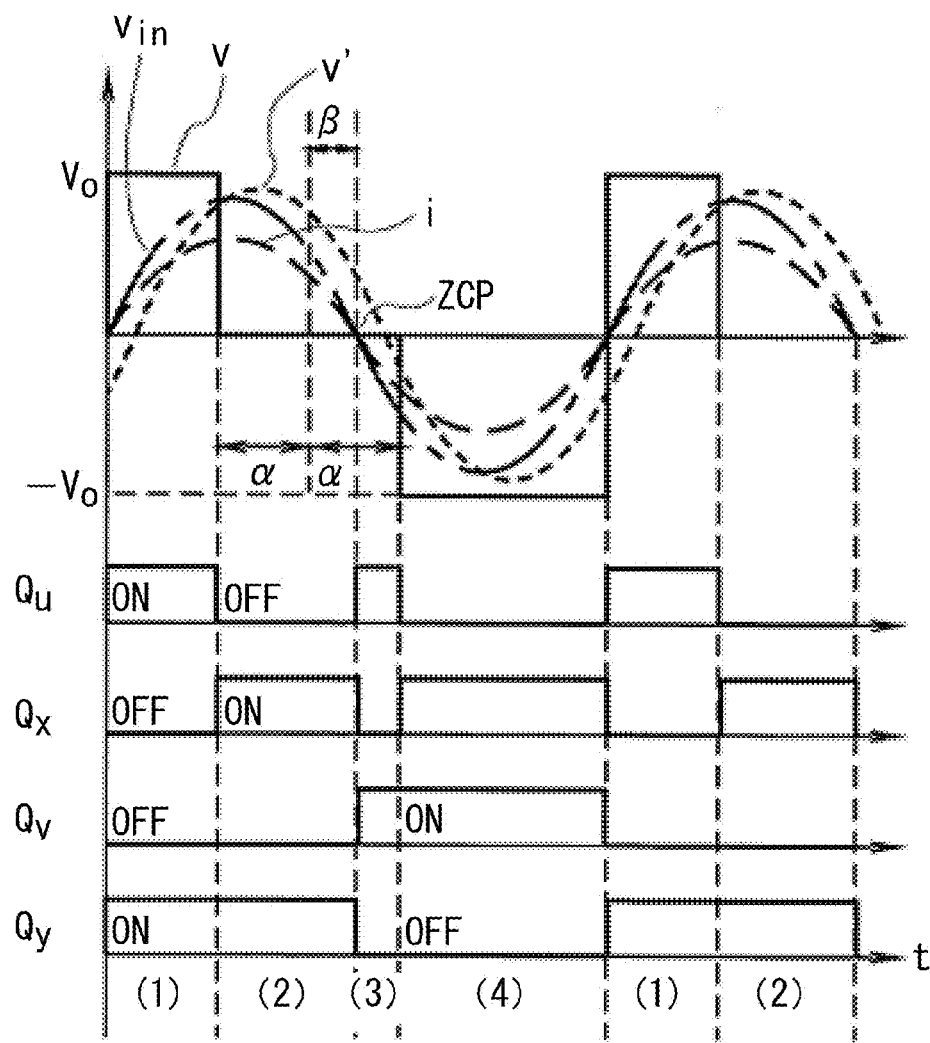
FIG. 14 illustrates an operation of a second prior application invention.
Figure 15:
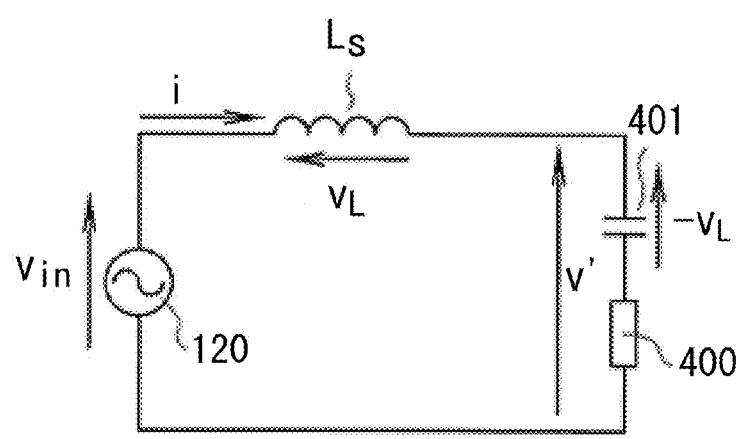
FIG. 15 illustrates an input side equivalent circuit of the power receiving circuit illustrated in FIG. 10.
Figure 16:
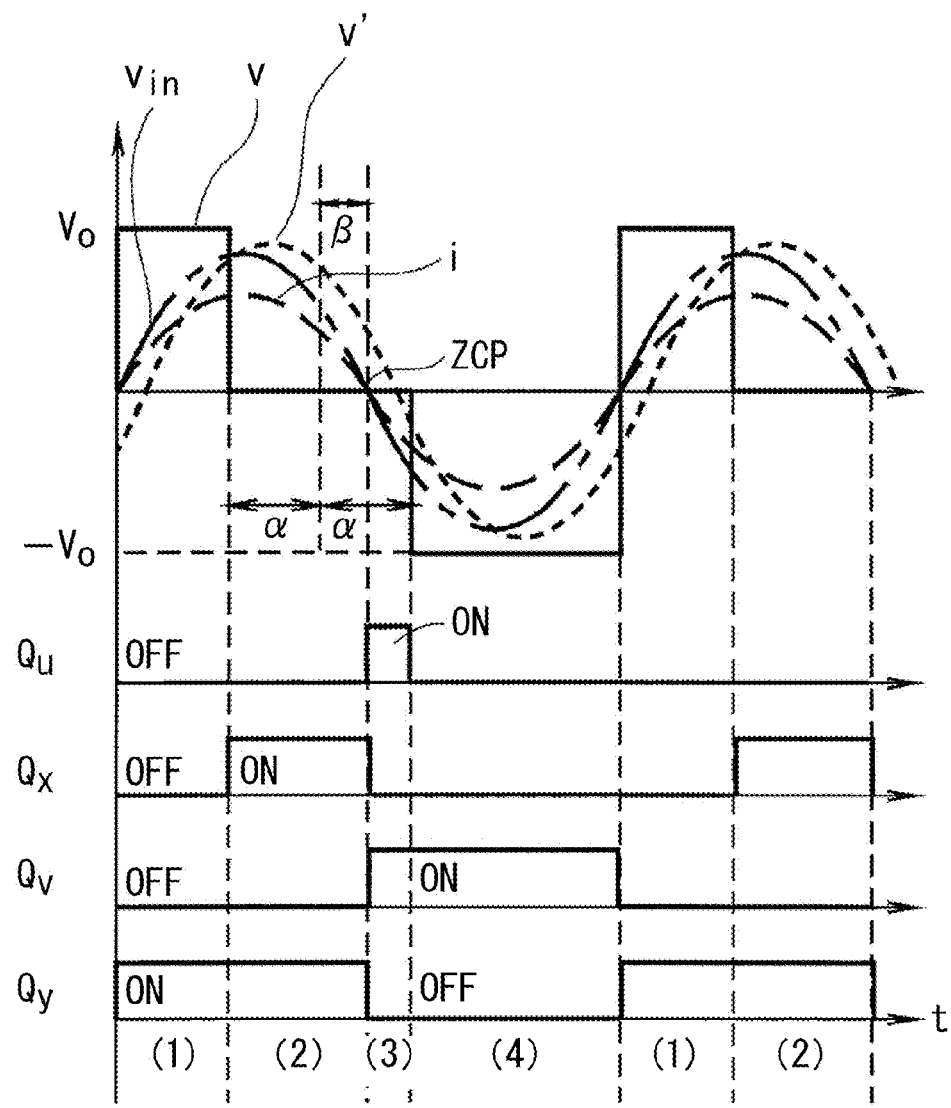
FIG. 16 illustrates an operation of the second prior application invention.

The non-contact power supply device illustrated in FIG. 1 is configured similarly to that in FIG. 10. Namely, a power receiving circuit 320 includes semiconductor switches $Q_u$, $Q_x$, $Q_v$, and $Q_y$, diodes $D_u$, $D_x$, $D_v$, and $D_y$, and a smoothing capacitor C. The semiconductor switches $Q_u$, $Q_x$, $Q_v$, and $Q_y$ are bridge-connected. The diodes $D_u$, $D_x$, $D_v$, and $D_y$ are respectively connected to the switches in inverse-parallel. The smoothing capacitor $C_0$ is connected between DC terminals of a bridge circuit which is formed of these elements. A series circuit of a resonance capacitor $C_r$ and a power receiving coil 120 is connected between AC terminals of the bridge circuit, and a load R is connected to both ends of the smoothing capacitor $C_0$. Here, 100 is a high frequency power source, and 110 is a primary side power supply line.

On the other hand, a control device 200 generates driving signals of the switches $Q_u$, $Q_x$, $Q_v$, and $Q_y$ on the basis of a voltage $V_0$ between the DC terminals and a current i of the power receiving coil 120 detected by a current detection unit CT, and outputs the driving signals.

Figure 2:
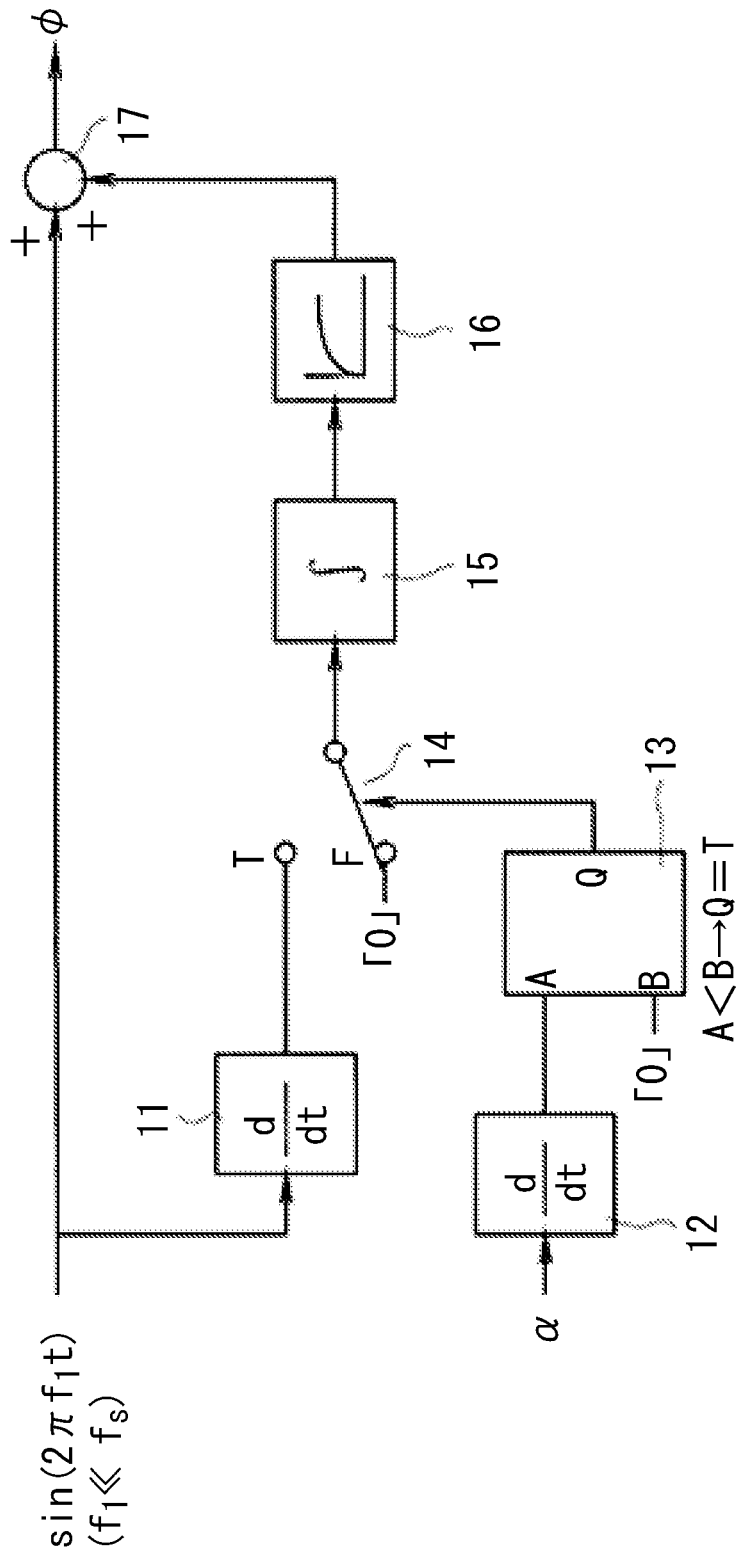
FIG. 2 is a control block diagram of the power supply device illustrated in FIG. 1.

Described next is a method for controlling the power supply device. FIG. 2 is a control block diagram of the power supply device illustrated in FIG. 1, and is for calculating a compensation period (angle) $\phi$ as described below. In addition, FIG. 3 illustrates operating waveforms of a current i that flows through the power receiving coil 120, an induced voltage $v_{in}$ of the power receiving coil 120, a voltage v between AC terminals of the bridge circuit, and a fundamental wave component v' of the voltage v between the AC terminals of the bridge circuit, and driving signals of the switches $Q_u$, $Q_x$, $Q_v$, and $Q_y$.

Described below is a first embodiment on the basis of FIG. 2 and FIG. 3.

First, in the control block illustrated in FIG. 2, a sine wave input signal $\sin(2\pi f_1 t)$ for one cycle is provided. A frequency $f_1$ of the sine wave input signal is set to be a sufficiently smaller value than a power source frequency $f_s$, such as about $\frac{1}{10}$ of $f_s$. When an output of the control block is a compensation period $\phi$ from a zero crossing point ZCP of a current i in FIG. 3 (corresponding to a compensation period $\beta$ in the second prior application invention described above), the period $\phi$ is changed with the same frequency $f_1$ as that of the input signal $\sin(2\pi f_1 t)$. When this happens, as the input signal is changed, a time period $\alpha$ in FIG. 3 is also changed. When the input power factor of the power receiving circuit 320 is low, $\alpha$ becomes long, and when the input power factor is high, $\alpha$ becomes short. A reason for that is described below.

Figure 3:
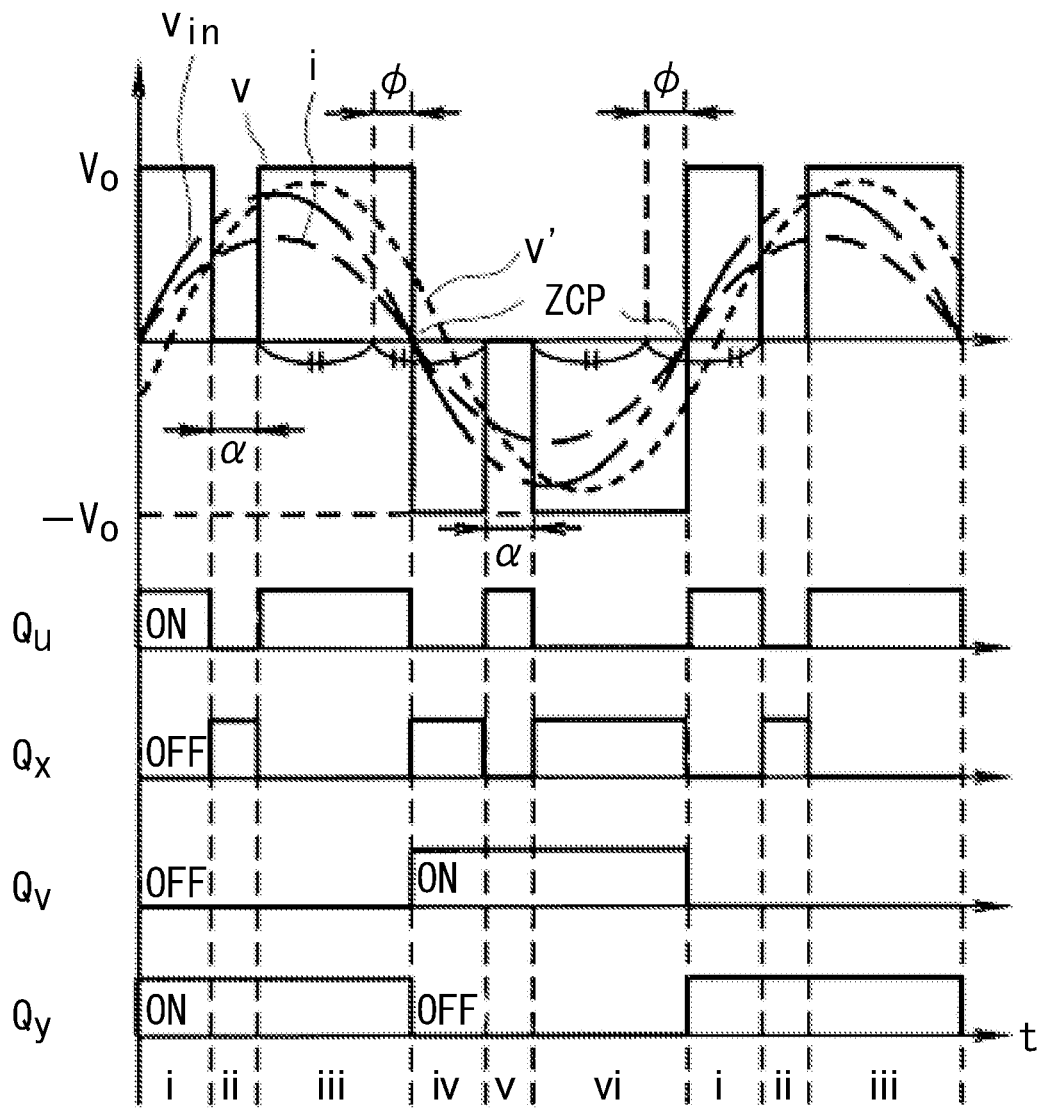
FIG. 3 illustrates an operation of a first embodiment in the power supply device illustrated in FIG. 1.

First, during a time period ii that corresponds to the time period $\alpha$ (a time period during which a voltage v is a zero voltage) in FIG. 3, the switches $Q_x$ and $Q_y$ are turned on, the switches $Q_u$ and $Q_v$ are turned off, the current i flows with a route of a power receiving coil 120 a resonance capacitor $C_r \rightarrow$ a switch $Q_x \rightarrow$ a diode $D_y \rightarrow$ the power receiving coil 120, and energy is stored in the power receiving coil 120. At the same time, the voltage v between the AC terminals becomes a zero voltage. During a time period v that similarly corresponds to the time period $\alpha$, the switches $Q_u$ and $Q_v$ are turned on, the switches $Q_x$ and $Q_y$ are turned off, the current i flows with a route of a power receiving coil $120 \rightarrow$ a diode $D_v \rightarrow$ a switch $Q_u \rightarrow$ a resonance capacitor $C_r \rightarrow$ the power receiving coil 120, and energy is stored in the receiving coil 120. At the same time, the voltage v between the AC terminals becomes a zero voltage.

During time periods i, iii, iv, and vi other than the time periods ii and v described above, the energy stored in the power receiving coil 120 is discharged, and a smoothing capacitor $C_0$ is charged.

Namely, during the time periods i and iii, the switches $Q_u$ and $Q_y$ are turned on, the switches $Q_x$ and $Q_v$ are turned off, the current i flows with a route of a power receiving coil 120→a resonance capacitor $C_r$→a diode $D_u$→a smoothing capacitor $C_0$ a diode $D_y$→the power receiving coil 120, and the smoothing capacitor $C_0$ is charged. The voltage v between the AC terminals becomes a positive voltage whose peak value is the voltage $V_0$ between the DC terminals.

In addition, during the time periods iv and vi, the switches $Q_x$ and $Q_v$ are turned on, the switches $Q_u$ and $Q_y$ are turned off, the current i flows with a route of a power receiving coil 120→a diode $D_v$→a smoothing capacitor $C_0$→a diode $D_x$→a resonance capacitor $C_r$→the power receiving coil 120, and the smoothing capacitor $C_0$ is charged. The voltage v between the AC terminals becomes a negative voltage whose peak value is the voltage $V_0$ between the DC terminals.

Here, the longer the time period α, which is a time period in which energy is stored in the power receiving coil 120, the more energy is stored in the power receiving coil 120, and as a result, the current i is increased. Accordingly, the longer the time period α, the larger the current i. On the other hand, when the input power factor of the power receiving coil 120 is low, an input current becomes large, and when the input power factor is high, the input current becomes small. Therefore, the input power factor of the power receiving circuit 320 is low, α becomes long, and when the input power factor is high, α becomes short.

In view of the above, the control block in FIG. 2 is configured such that when a change amount (a differential value) in the time period α in which the voltage v is a zero voltage in FIG. 3 is negative, a change amount (a differential value) of the input signal $\sin(2\pi f_1 t)$ is integrated, and when the change amount in the time period α is positive, "0" is integrated.

In FIG. 2, 11 denotes a differential unit that differentiates $\sin(2\pi f_1 t)$, and 12 denotes a differential unit that differentiates the time period α. In addition, 13 denotes a comparison unit, and operates a switching unit 14 in response to an output Q corresponding to a comparison result between an output from the differential unit 12 (an input to a terminal A) and "0" (an input to a terminal B). A switching destination of the switching unit 14 is an output from the differential unit 11 (an input of a terminal T) or "0" (an input of a terminal F). The switching destination of the switching unit is switched to the terminal T in response to the output Q of the comparison unit 13 when the change amount in the time period α is negative, and the change destination of the switching unit is switched to the terminal F when the change amount in the time period α is positive. In addition, 15 denotes an integration unit that integrates an output from the switching unit 14, and 16 denotes a low-pass filter unit that cuts an input frequency ($f_1$) component from an output from the integration unit 15.

Then, the input signal $\sin(2\pi f_1 t)$ and an output from the low-pass filter unit 16 are added by an adding unit 17, and the addition result is output as a compensation period φ.

If the change amount in the time period α is positive, α is long, and therefore the input power factor is low. Accordingly, a compensation period φ at this point is unsuitable for improving the power factor, and is ignored (the integration unit 15 integrates "0"). In contrast, if the change amount in the time period α is negative, α is short, and therefore the input power factor is improved. Accordingly, a compensation period φ at this point is suitable for improving the power factor, and the integration unit 15 integrates the output from the differential unit 11 through the terminal T of the switching unit 14.

When one cycle of the input signal $\sin(2\pi f_1 t)$ has been finished in accordance with the processes above, an integration value of a change amount of the input signal $\sin(2\pi f_1 t)$, namely, a compensation period φ during which a time period α is the shortest (an input power factor is the highest), remains in the output.

Accordingly, the control device 200 drives the switches $Q_u$, $Q_x$, $Q_v$, and $Q_y$ such that a voltage v between AC terminals becomes a positive-negative voltage whose peak value is a voltage $V_0$ between DC terminals only during prescribed equal time periods before and after a point which has deviated from each zero crossing point ZCP of the current i in FIG. 3 by the compensation period φ above and such that the voltage between the AC terminals becomes a zero voltage during the other time periods α. As a result, the input power factor of the power receiving circuit 320 is improved.

Described next is a second embodiment that corresponds to claim 2.

FIG. 4 illustrates operating waveforms of a current i that flows through the power receiving coil 120, an induced voltage $v_{in}$ of the power receiving coil 120, a voltage v between AC terminals of a bridge circuit, and a fundamental wave component v' of the voltage v between the AC terminals of the bridge circuit, and driving signals of switches $Q_u$, $Q_x$, $Q_v$, and $Q_y$, in a case in which the second embodiment is applied to the non-contact power supply circuit illustrated in FIG. 1.

Details of a route of the current i are omitted, but during time periods forming a time period α (time periods during which the voltage v is a zero voltage) I, III, IV, and VI in FIG. 4, the current i flows with a route passing through a power receiving coil 120, a resonance capacitor $C_r$, and any of the switches $Q_u$, $Q_x$, $Q_v$, and $Q_y$ and diodes $D_u$, $D_x$, $D_v$, and $D_y$. During the time periods I, III, IV, and VI, energy is stored in the power receiving coil 120. On the other hand, during time periods II and V other than the time periods I, III, IV, and VI above, the energy stored in the power receiving coil 120 is discharged, and a smoothing capacitor $C_0$ is charged.

Also in the second embodiment, similarly to the first embodiment, the longer the time period α during which energy is stored in the power receiving coil 120, the more energy is stored, and therefore the current i is increased. On the other hand, when an input power factor of the power receiving circuit 320 is low, an input current becomes large, and when the input power factor is low, the input current becomes small. Therefore, when the input power factor of the power receiving circuit 320 is low, α becomes long, and when the input power factor is high, α becomes short.

Therefore, also when the voltage v between the AC terminals is controlled as illustrated in FIG. 4, a compensation period φ is obtained by using the control block illustrated in FIG. 2. Then, the control device 200 drives the switches $Q_u$, $Q_x$, $Q_v$, and $Q_y$ such that the voltage v between the AC terminals becomes a zero voltage only during prescribed equal time periods (each time period having a length of α/2) before and after a point which has deviated from each zero crossing point ZCP of the current i in FIG. 4 by the compensation period φ and such that the voltage v between the AC terminals becomes a positive-negative voltage whose peak value is a voltage $V_0$ between DC terminals during the other time periods. As a result, the input power factor of the power receiving circuit 320 is improved.

Described next is a third embodiment that corresponds to claim 3.

FIG. 5 illustrates operating waveforms of a current i that flows through the power receiving coil 120, an induced voltage $v_{in}$ of the power receiving coil 120, a voltage v between AC terminals of a bridge circuit, and a fundamental wave component v' of the voltage v between the AC terminals of the bridge circuit, and driving signals of switches $Q_u$, $Q_x$, $Q_v$, and $Q_y$, in a case in which the third embodiment is applied to the non-contact power supply circuit illustrated in FIG. 1.

Details of a route of the current i are omitted, but during time periods forming a time period α (time periods during which the voltage v is a zero voltage) (2) and (3) in FIG. 5, the current i flows with a route passing through a power receiving coil 120, a resonance capacitor $C_r$, and any of the switches $Q_u$, $Q_x$, $Q_v$, and $Q_y$ and diodes $D_u$, $D_x$, $D_v$, and $D_y$. During the time periods (2) and (3), energy is stored in the power receiving coil 120. On the other hand, during time periods φ and (4) other than the time periods (2) and (3) above, the energy stored in the power receiving coil 120 is discharged, and a smoothing capacitor $C_0$ is charged.

Also in the third embodiment, similarly to the first and second embodiments, the longer the time period α during which energy is stored in the power receiving coil 120, the more energy is stored, and therefore the current i is increased. On the other hand, when an input power factor of the power receiving circuit 320 is low, an input current becomes large, and when the input power factor is high, the input current becomes small. Therefore, when the input power factor of the power receiving circuit 320 is low, α becomes long, and when the input power factor is high, α becomes short.

Therefore, also when the voltage v between the AC terminals is controlled as illustrated in FIG. 5, a compensation period φ is obtained by using the control block illustrated in FIG. 2. Then, the control device 200 drives the switches $Q_u$, $Q_x$, $Q_v$, and $Q_y$ such that the voltage v between the AC terminals becomes a zero voltage only during prescribed equal time periods (each time period having a length of α) before and after a point which has deviated from a zero crossing point ZCP of the current i in FIG. 5 by the compensation period φ and such that the voltage v between the AC terminals is a positive-negative voltage whose peak value is a voltage $V_0$ between DC terminals during the other time periods. As a result, the input power factor of the power receiving circuit 320 is improved.

Figure 6:
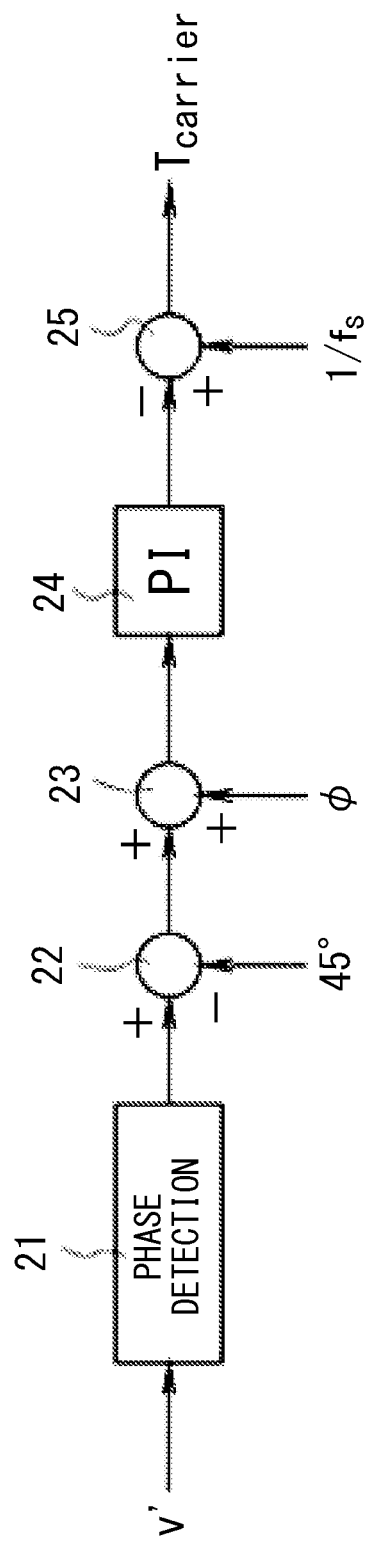
FIG. 6 is a control block diagram in a case in which a PLL control is performed by using a compensation period $\phi$ obtained in the first through third embodiments.
Figure 8:
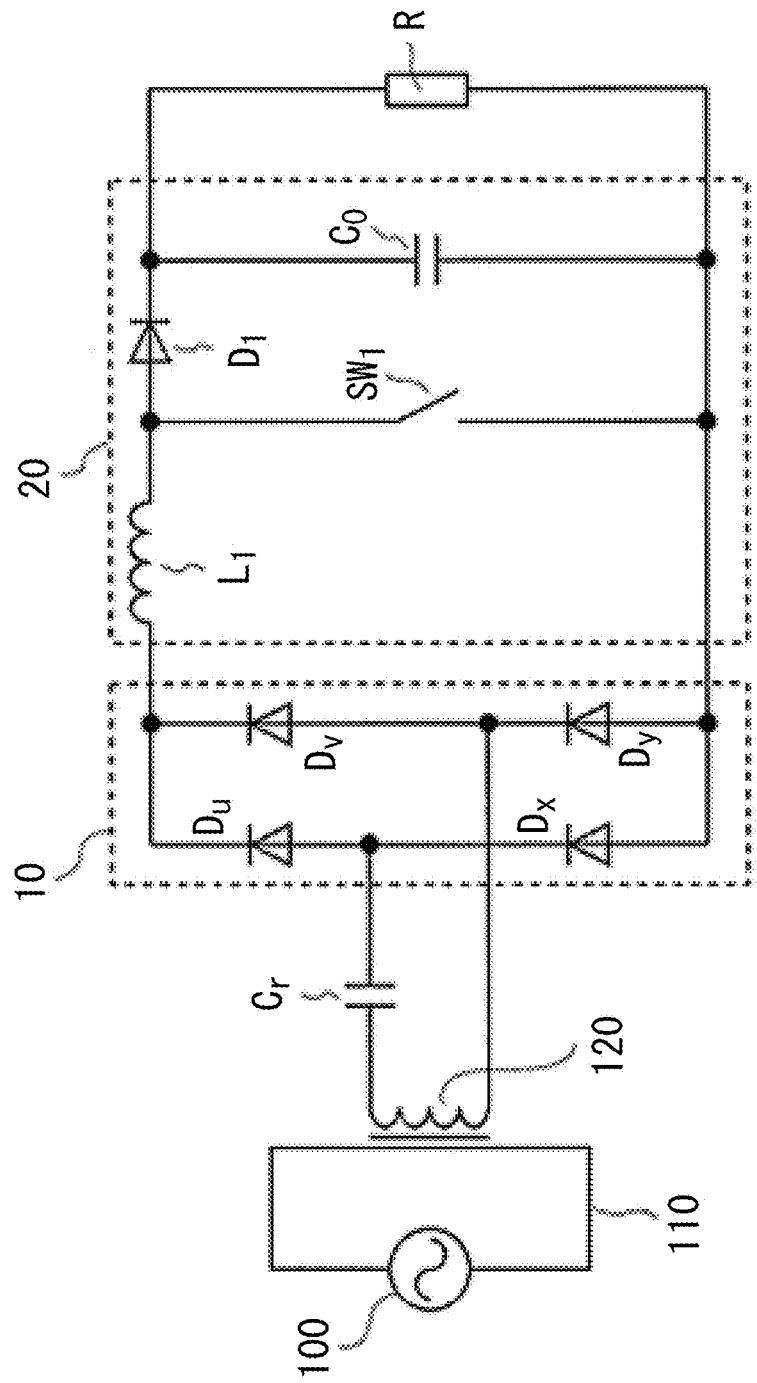
FIG. 8 is a circuit diagram of a conventional technology described in Japanese Laid-open Patent Publication No. 2002-354711.
Figure 9:
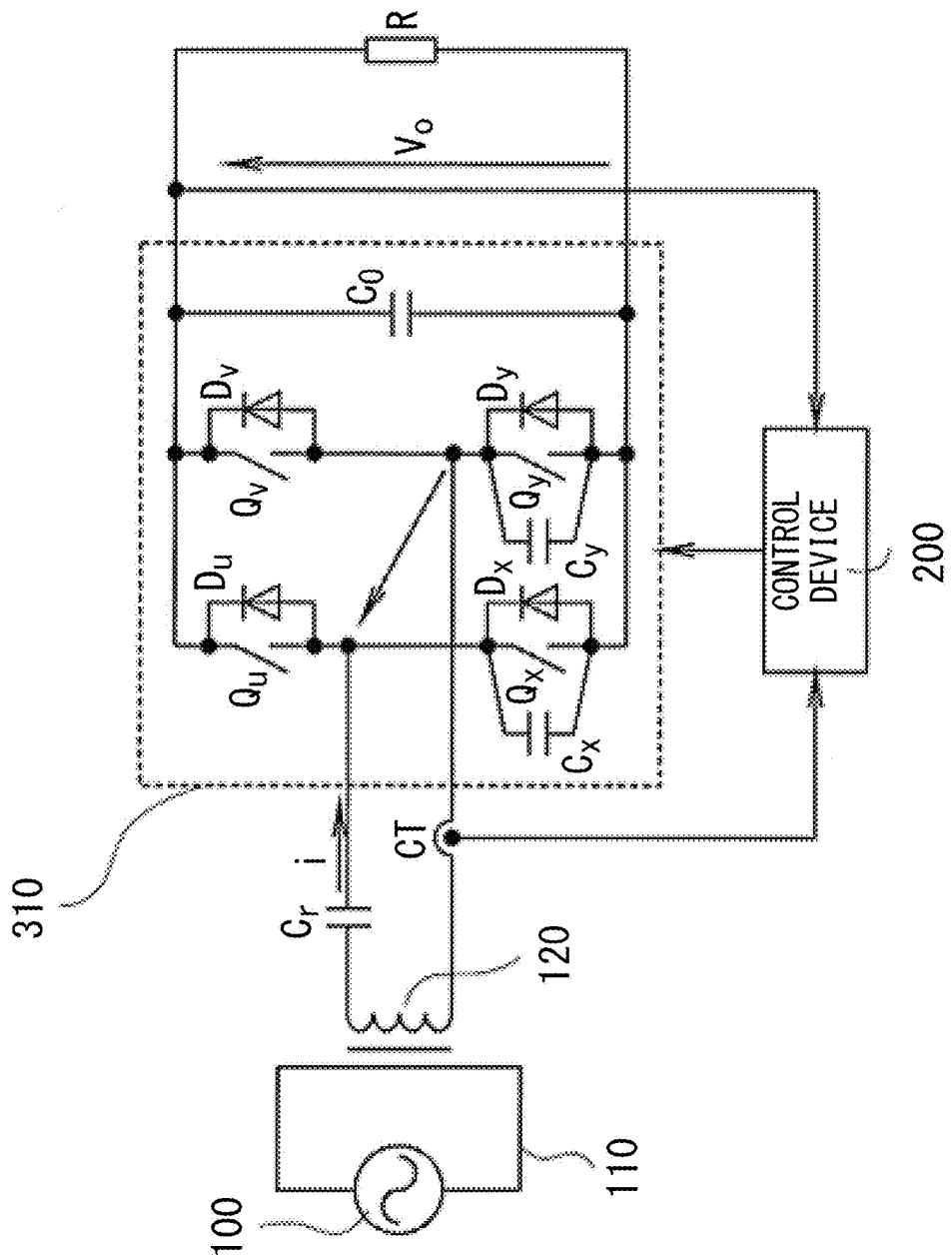
FIG. 9 is a circuit diagram of a conventional technology described in Japanese Laid-open Patent Publication No. 2012-125138.

Next, FIG. 6 is a control block diagram in a case in which a PLL control is used as a method for actually controlling a phase by using a compensation period φ obtained in each of the embodiments, and FIG. 7 illustrates operating waveforms of the control block illustrated in FIG. 6.

In FIG. 6, 21 denotes a phase detection unit that detects a phase of a fundamental wave component v' of a voltage between AC terminals, 22 denotes a subtraction unit that subtracts 45° from the phase of the fundamental wave component v', 23 denotes an adding unit that adds an output from the subtraction unit 22 and the compensation period (angle) φ, 24 denotes a PI adjustment unit that performs proportional integration operation for an output from the adding unit 23, and 25 denotes a subtraction unit that subtracts an output from the PI adjustment unit 24 from an inverse ($1/f_s$) of a power source frequency $f_s$. An output from the subtraction unit 25 is a carrier frequency $T_{carrier}$ at the time of controlling a bridge circuit by PWM. In addition, FIG. 7 illustrates a waveform of the fundamental wave component v' and a waveform of the PWM carrier (in cases in which φ≠0 and φ=0).

In this example, a PLL control and a calculation of the compensation period φ are performed on the basis of the fundamental wave component v' of the voltage between the AC terminals. A carrier frequency $T_{carrier}$ is calculated once in one cycle of the PWM carrier, for example, once at a timing of a ridge of the PWM carrier. When the carrier frequency $T_{carrier}$ is calculated, the compensation period φ obtained by the control block in FIG. 2 is applied. As a result, a driving signal of a switch that improves the input power factor of the power receiving circuit 320 is generated.

A case targeting the non-contact power supply device in FIG. 1 has been described above; however, the present invention is applicable to various power receiving circuits within a scope described in the claims, such as a power receiving circuit without the switches $Q_u$ and $Q_v$ of the upper arm in FIG. 1.

The present invention enables inhibiting losses of the entirety of a power supply device by improving an input power factor of a power receiving circuit in a case in which a resonance frequency of a resonance circuit does not coincide with a power source frequency even when the power supply device is in operation, and reducing a size and cost of the power supply device.

What is claimed is:

1. A power supply device comprising:
   a power receiving coil configured to exchange power by an external magnetic coupling;
   a bridge circuit in which one end of the power receiving coil is connected to one alternating-current (AC) terminal through a resonance capacitor forming a resonance circuit with the power receiving coil, and another end of the power receiving coil is connected to another AC terminal;
   a smoothing capacitor configured to be connected between direct-current (DC) terminals of the bridge circuit, and to be connected to both ends of a load;
   a current detection unit configured to detect an input current that flows through the power receiving coil;
   a voltage detection unit configured to detect a voltage between the DC terminals of the bridge circuit; and
   a control unit configured to switch a semiconductor switch in the bridge circuit, the bridge circuit including a plurality of switching arms each of which comprises an inverse-parallel connection of the semiconductor switch and a diode,
   wherein the control unit switches the semiconductor switch such that a voltage between the AC terminals of the bridge circuit becomes a positive-negative voltage whose peak value is the voltage between the DC terminals only during prescribed equal time periods before and after a point that has deviated from each zero crossing point in one cycle of the input current by a prescribed compensation period and such that the voltage between the AC terminals becomes a zero voltage during time periods other than said prescribed equal time periods, and sets the compensation period such that a time period during which the voltage between the AC terminals becomes a zero voltage is minimized to maximize an input power factor.

2. A power supply device comprising:
   a power receiving coil configured to exchange power by an external magnetic coupling;
   a bridge circuit in which one end of the power receiving coil is connected to one alternating-current (AC) terminal through a resonance capacitor forming a resonance circuit with the power receiving coil, and another end of the power receiving coil is connected to another AC terminal;
   a smoothing capacitor configured to be connected between direct-current (DC) terminals of the bridge circuit, and to be connected to both ends of a load;
   a current detection unit configured to detect an input current that flows through the power receiving coil;

a voltage detection unit configured to detect a voltage between the DC terminals of the bridge circuit; and a control unit configured to switch a semiconductor switch in the bridge circuit, the bridge circuit including a plurality of switching arms each of which comprises an inverse-parallel connection of the semiconductor switch and a diode, wherein the control unit switches the semiconductor switch such that a voltage between the AC terminals of the bridge circuit becomes a zero voltage only during prescribed equal time periods before and after a point that has deviated from each zero crossing point in one cycle of the input current by a prescribed compensation period and such that the voltage between the AC terminals becomes a positive-negative voltage whose peak value is the voltage between the DC terminals during time periods other than said prescribed equal time periods, and sets the compensation period such that a time period during which the voltage between the AC terminals becomes a zero voltage is minimized to maximize input power factor.

3. A power supply device comprising:

a power receiving coil configured to exchange power by an external magnetic coupling;

a bridge circuit in which one end of the power receiving coil is connected to one alternating-current (AC) terminal through a resonance capacitor forming a resonance circuit with the power receiving coil, and another end of the power receiving coil is connected to another AC terminal;

a smoothing capacitor configured to be connected between direct-current (DC) terminals of the bridge circuit, and to be connected to both ends of a load;

a current detection unit configured to detect an input current that flows through the power receiving coil;

a voltage detection unit configured to detect a voltage between the DC terminals of the bridge circuit; and a control unit configured to switch a semiconductor switch in the bridge circuit, the bridge circuit including a plurality of switching arms each of which comprises an inverse-parallel connection of the semiconductor switch and a diode, wherein the control unit switches the semiconductor switch such that a voltage between the AC terminals of the bridge circuit becomes a zero voltage only during prescribed equal time periods before and after a point that has deviated from one of two zero crossing points in one cycle of the input current by a prescribed compensation period and such that the voltage between the AC terminals becomes a positive-negative voltage whose peak value is the voltage between the DC terminals during time periods other than said prescribed equal time periods, and sets the compensation period such that a time period during which the voltage between the AC terminals becomes a zero voltage is minimized to maximize input power factor.

* * * * *